(12) United States Patent
Cranfil

(10) Patent No.: US 8,395,597 B2
(45) Date of Patent: Mar. 12, 2013

(54) METHOD AND DEVICE FOR PROVIDING AN EQUI-POTENTIAL TOUCH SCREEN

(75) Inventor: David B. Cranfil, Antioch, IL (US)

(73) Assignee: Motorola Mobility LLC, Libertyville, IL (US)

( * ) Notice: Subject to any disclaimer, the term of this patent is extended or adjusted under 35 U.S.C. 154(b) by 342 days.

(21) Appl. No.: 12/820,162

(22) Filed: Jun. 22, 2010

(65) Prior Publication Data

US 2011/0096020 A1 Apr. 28, 2011

Related U.S. Application Data

(60) Provisional application No. 61/255,277, filed on Oct. 27, 2009.

(51) Int. Cl.
*G06F 3/044* (2006.01)
(52) U.S. Cl. ........................ 345/174; 345/173; 178/18.06
(58) Field of Classification Search .......... 345/173–179; 178/18.06
See application file for complete search history.

(56) References Cited

U.S. PATENT DOCUMENTS

| 3,593,115 | A | 7/1971 | Dym et al. | |
| 2003/0080744 | A1* | 5/2003 | Goldfine et al. | 324/345 |
| 2007/0247443 | A1* | 10/2007 | Philipp | 345/173 |
| 2007/0279395 | A1* | 12/2007 | Philipp et al. | 345/173 |
| 2008/0246496 | A1 | 10/2008 | Hristov et al. | |
| 2010/0044122 | A1 | 2/2010 | Sleeman et al. | |
| 2010/0045632 | A1 | 2/2010 | Yilmaz et al. | |

FOREIGN PATENT DOCUMENTS

WO 2007024486 A2 3/2007

OTHER PUBLICATIONS

Patent Cooperation Treaty, International Search Report and Written Opinion of the International Searching Authority for International Application No. PCT/US2010/0051437, Dec. 30, 2010, 12 pages.

* cited by examiner

*Primary Examiner* — Van Chow
(74) *Attorney, Agent, or Firm* — Gary J. Cunningham

(57) ABSTRACT

Disclosed is a method (50) and device (100) for providing an equi-potential touch screen. The method can include: providing (52) a capacitive touch screen including transmit electrodes and receive electrodes combined to form a grid structure configured to provide capacitive signals that allow position of touch to be resolved; and driving (54) a substantially central transmit electrode with equi-potential connection points. The method (50) and device (100) provide a touch screen device which allows drive lines to be split on either side of the touch screen device, while being highly linear. For example, the frame area surrounding the touch screen can be made narrower or thinner, for minimal real estate and optimizing design layout.

16 Claims, 3 Drawing Sheets

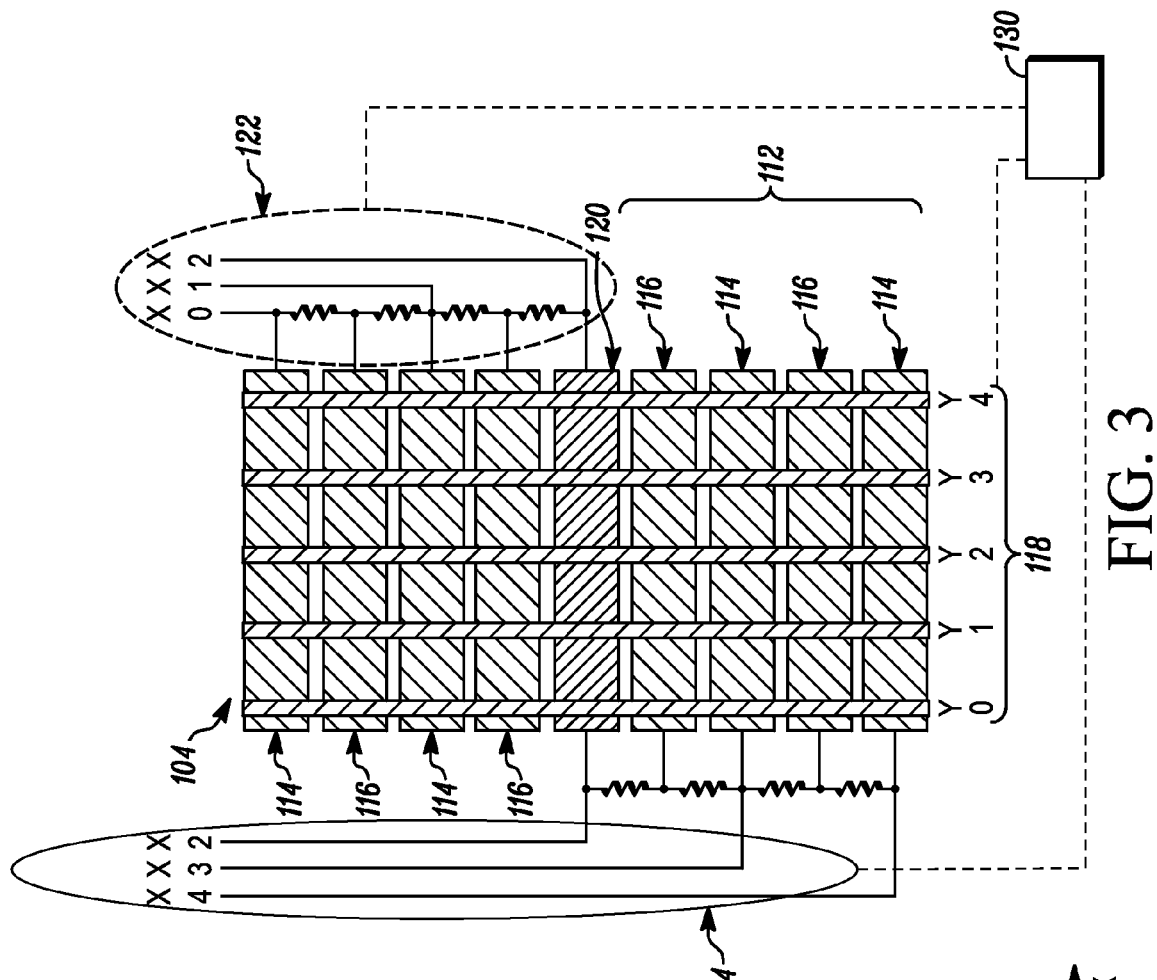
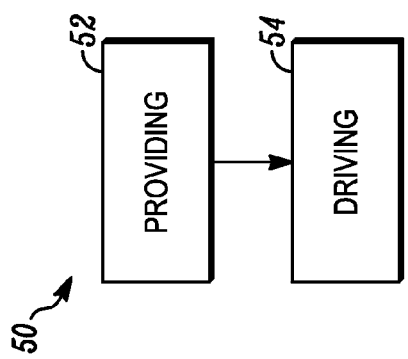
FIG. 2

METHOD AND DEVICE FOR PROVIDING AN EQUI-POTENTIAL TOUCH SCREEN

FIELD

Disclosed is a method and device for providing an equi-potential touch screen.

BRIEF DESCRIPTION

The makers of mobile communication devices, including those of cellular telephones, are increasingly adding functionality to their devices. While there is a trend toward the inclusion of more features and improvements for current features, there is also a trend toward smaller mobile communication devices. As mobile communication device technology has continued to improve, the devices have become increasingly smaller and thinner. Fewer and/or smaller hardware and software components are therefore desirable when adding new features and making improvements to the current features in the smaller devices. Fewer hardware components may provide a cost benefit to the consumer.

In FIG. 1, a prior art resistively interpolated capacitive touch screen is shown 10. A plurality of drive electrodes 12 include directly connected electrodes 14 and interpolated electrodes 16. The interpolated electrodes 16 are connected to the drive electrodes via resistors, often created within the touch screen pattern. The resistive nature of the ITO film requires the resistive ladder to be connected only on one side, as the resistance of crossing from one side to another causes a disadvantageous non-linearity. Thus all of the connections are required to be on a single side.

Having all of the drive lines on one side of the touch screen presents a packaging problem, requiring a large area outside the glass area 18, to print and route the electrodes. Stated differently, they require an asymmetric lens design with a display off-center.

In the capacitively interpolated touch screen art, it would be considered an improvement if all the drive electrodes did not have to be connected on the same side, to avoid non-linearities, which could provide greater packaging freedom and design opportunities.

It would be considered beneficial, to provide a touch screen device which allows drive lines to be split on either side of the touch screen device, while being highly linear. For example, in such a device the frame area surrounding the touch screen could then be made narrower or thinner.

BRIEF DESCRIPTION OF THE DRAWINGS

FIG. 2 is a block diagram for a method for providing an equi-potential touch screen, in accordance with the instant invention.

FIG. 3 is a simplified view of an embodiment for a device for providing an equi-potential touch screen, in accordance with the instant invention.

DETAILED DESCRIPTION

Figure 1:
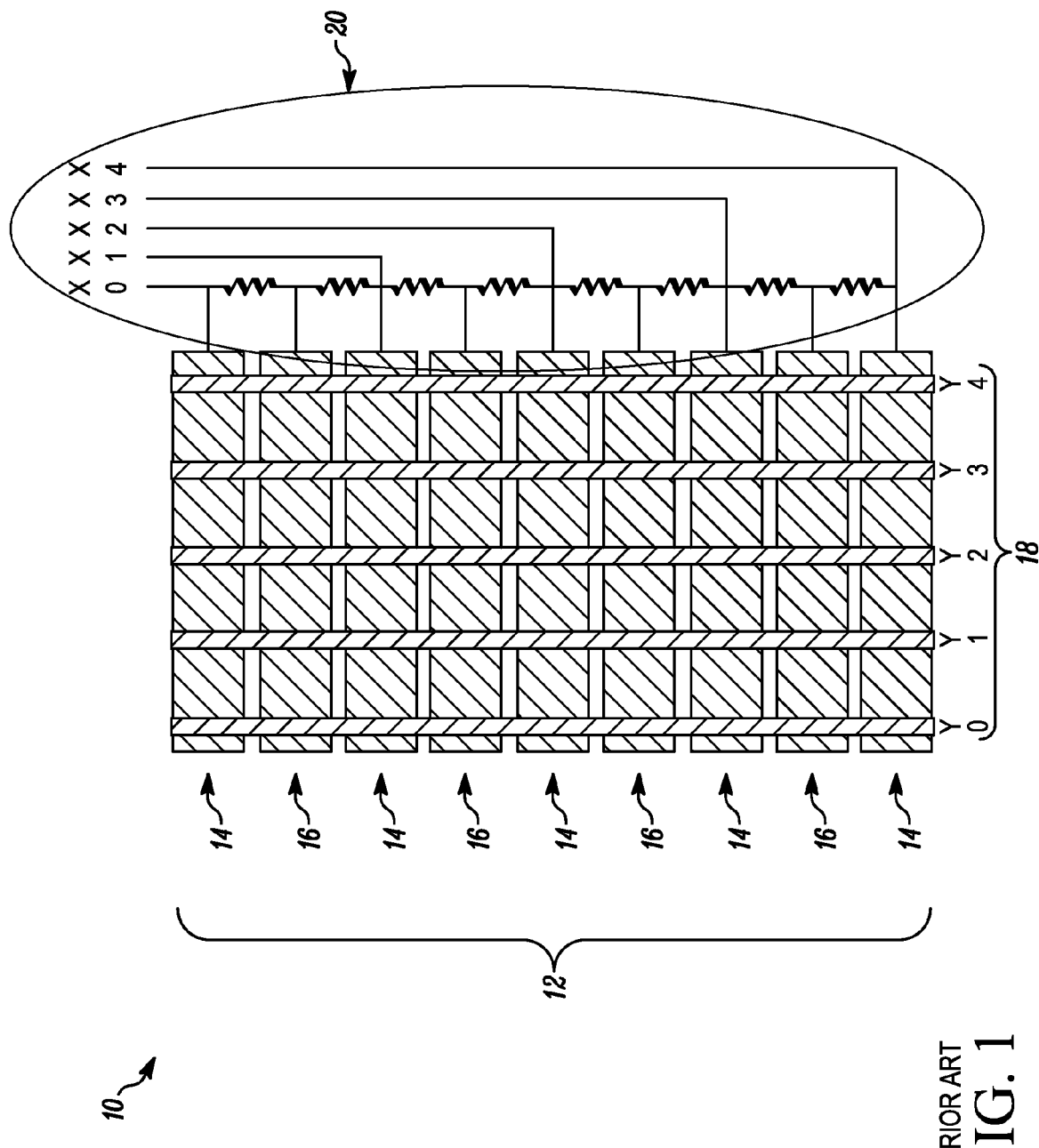
FIG. 1 is a prior art resistively interpolated capacitive touch screen shown with all the drive electrodes connected on the same side.

Disclosed and shown in the figures, is a touch screen device and method of sensing an object near the surface of a touch screen device.

In one embodiment, a method 50 for providing an equi-potential touch screen, is disclosed and shown in FIG. 2. The method 50 includes: providing 52 a capacitive touch screen including transmit electrodes and receive electrodes combined to form a grid structure configured to provide capacitive signals that allow position of touch to be resolved; and driving 54 a substantially central transmit electrode with equi-potential connection points. Advantageously, the method allows the routing of drive lines on either side of the touch screen, which is highly linear. This provides narrow packaging and reducing electrode complexity. Also, the frame area surrounding the touch screen can be made narrower, as desired, for minimal real estate and optimizing design layout.

In one embodiment, the method includes providing alternating transmit electrodes comprising alternating driven transmit electrodes and interpolated transmit electrodes that are resistively connected to adjacent driven transmit electrodes. This feature helps to allow reduction of the required drive lines, thus reducing costs and packaging complexity.

In one arrangement, the driving step 54 includes creating equi-potential points, shown as A and B on FIG. 3, on either side of the substantially central transmit electrode 120. This feature helps to minimize and eliminate the disadvantageous current flow across the central electrode that would introduce non-linearities.

In a preferred embodiment, the driving step 54 includes creating equi-potential points, A and B in FIG. 3, on either side of the substantially central transmit electrode via a pair of low impedence drive lines, shown at X2 in FIG. 3. For example, in a preferred embodiment, low impedence drive lines can be about two or more orders of magnitude lower in surface resistance, than the touch screen transmit electrodes. Thus, points A and B in FIG. 3, are essentially at the same potential.

The method 50 can include arranging the alternating transmit electrodes and interpolated transmit electrodes above and below the substantially central transmit electrode in a mirror image. Advantageously, this feature provides simplified and symmetrical routing, thus requiring minimal routing structure around the touch screen.

As should be understood by those skilled in the art, the number of transmit and receive electrodes is dependent on the size of the touch screen and resolution desired. For example, a control IC can provide drive signals through X0, X1, X2, X3, X4, etc. and receive return signals through Y0, Y1, Y2, Y3, Y4, etc., to determine the plot or touch position.

In a preferred embodiment, the method is particularly adapted for use in a portable wireless computing device.

Also in a preferred embodiment, the method includes routing drive lines 122 and 124 in FIG. 3, on either side of the touch screen, for connection to the driven transmit electrodes 122 and 124 and the connection points, at A and B in FIG. 3, of the equi-potential substantially central transmit electrode, for minimal space necessary for routing signals to and from the device, for improved size reduction.

Figure 4:
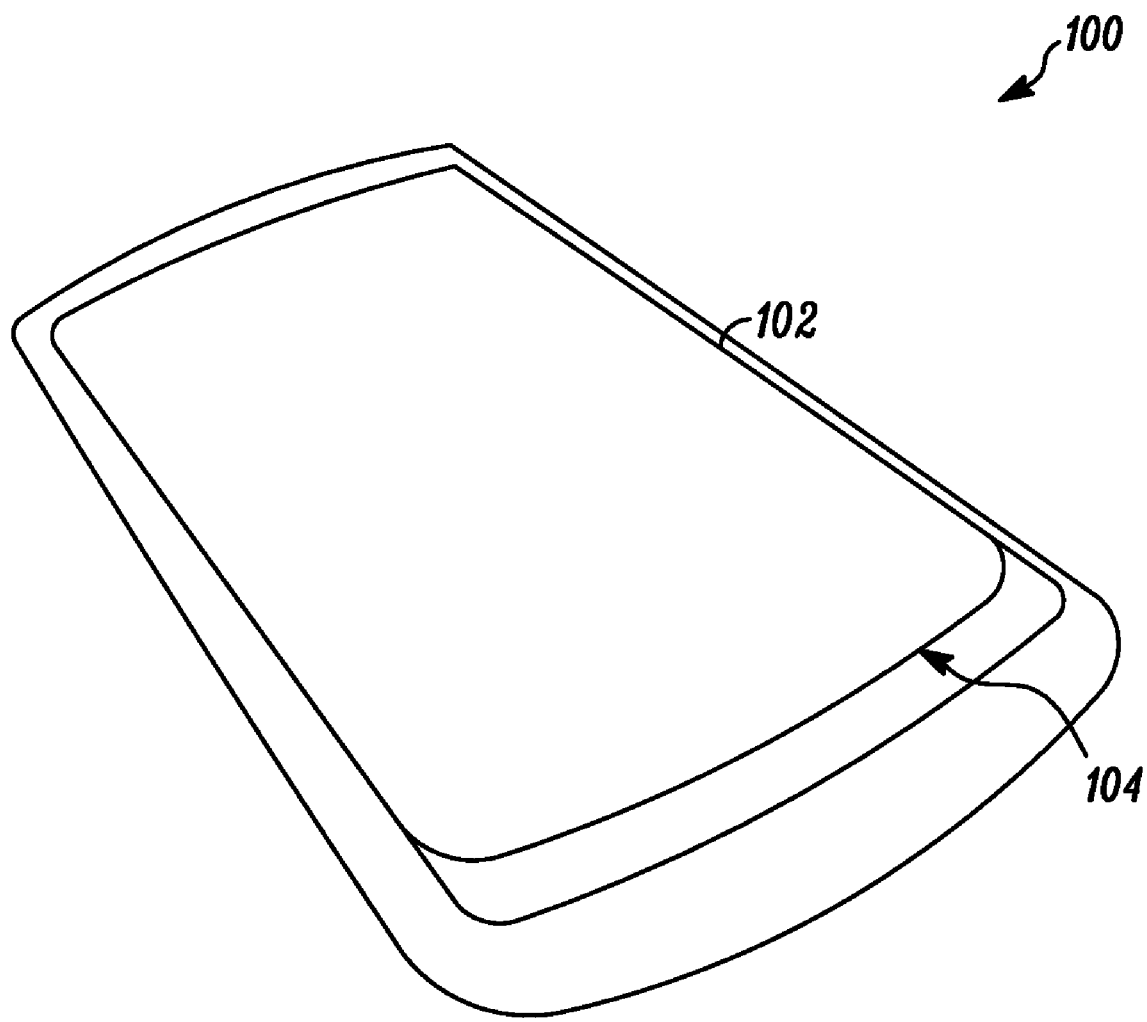
FIG. 4 is a perspective view of a touch screen device for providing an equi-potential touch screen, in accordance with the instant invention.

Referring to FIGS. 3 and 4, a touch screen device 100 having a touch surface 102 is shown. It can include: a sensor 104 including a plurality of drive electrodes 112 including directly connected electrodes 114 and interpolated electrodes 116. The interpolated electrodes 116 are connected to the drive electrodes 112 via resistors, preferably within the touch screen 100. The touch screen device 100 further includes transmit electrodes at 122 and 124 and receive electrodes 118, which are combined to form a grid structure. The touch screen device 100 also includes a substantially central transmit electrode 120 with equi-potential connection points, shown as items A and B in FIG. 3; and a controller 130, in communication with the sensor 104, configured to transmit and receive signals from the sensor to provide capacitive signals that allow position of touch to be resolved. Advantageously, a resistive ladder can be utilized to connect to both sides of the touch screen 100, for minimal space necessary for routing signals to and from the device 100, for improved size reduction. The touch screen device 100 allows drive lines to be split on either side of the touch screen device 100, which is highly linear. Further, advantageously, the frame area surrounding the touch screen can be made narrower, as desired, for minimal real estate and optimizing design layout.

In one embodiment, the touch surface 102 and sensor 104 are transparent. This structure provides user friendly actuation. In another embodiment, the touch surface can be opaque. As should be understood, this feature does not have to be transparent, as it could be implemented at various locations. For example, the touch surface 102 can be placed in a housing or behind a keypad.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

The controller 130 can include a touch sense algorithm where the sense lines can scan in one direction, for example the x-direction, and then the other direction, the y-direction. Depending on the algorithm for determining the position of the object on the touch screen, a scan may need include scanning in the x-direction.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method for providing an equi-potential touch screen, comprising:
   providing a capacitive touch screen including transmit electrodes and receive electrodes combined to form a grid structure configured to provide capacitive signals that allow position of touch to be resolved;
   providing alternating transmit electrodes comprising alternating driven transmit electrodes and interpolated transmit electrodes;
   locating a substantially central transmit electrode with equi-potential connection points on each side of the substantially central transmit electrode, the equi-potential connection points being at a substantially equal potential;
   arranging the alternating transmit electrodes and interpolated transmit electrodes above and below the substantially central transmit electrode; and
   driving the equi-potential connection points via a low impedence drive signal.

2. The method of claim 1, wherein the alternating driven transmit electrodes and interpolated transmit electrodes that are resistively connected to the adjacent driven transmit electrodes.

3. The method of claim 1, wherein the driving step includes creating equi-potential points on each side of the substantially central transmit electrode.

4. The method of claim 1, wherein the driving step includes creating equi-potential points on each side of the substantially central transmit electrode via a pair of low impedence drive lines.

5. The method of claim 1, wherein the alternating transmit electrodes and interpolated transmit electrodes above the substantially central transmit electrode are fed by routing lines from a right side and the alternating transmit electrodes and interpolated transmit electrodes below the substantially central transmit electrode are fed by routing lines from a left side.

6. The method of claim 1, wherein the number of transmit and receive electrodes is dependent on the size of the touch screen and resolution desired.

7. The method of claim 1, wherein it is used in a portable computing device.

8. The method of claim 1, further comprising routing drive lines on each side of the touch screen.

9. The method of claim 1, further comprising routing drive lines, on each side of the touch screen, connected to the driven transmit electrodes.

10. The method of claim 1, further comprising routing drive lines, on each side of the touch screen, connected to the driven transmit electrodes and the connection points of the equi-potential substantially central transmit electrode.

11. A touch screen device having a touch surface, comprising:
    a sensor including transmit electrodes and receive electrodes combined to form a grid structure;
    the sensor including alternating transmit electrodes comprising alternating driven transmit electrodes and interpolated transmit electrodes;
    a substantially central transmit electrode with equi-potential connection points being substantially centrally located along the sensor, the equi-potential connection points being at a substantially equal potential;
    the alternating transmit electrodes and interpolated transmit electrodes being arranged above and below the substantially central transmit electrode; and a controller, in communication with the sensor, configured to transmit and receive signals from the sensor to provide capacitive signals that allow position of touch to be resolved.

12. The device as recited in claim 11, wherein the touch surface and sensor are transparent.

13. The device as recited in claim 11, wherein the touch surface is opaque.

14. The device as recited in claim 11, wherein the alternating transmit electrodes and interpolated transmit electrodes above the substantially central transmit electrode are fed by routing lines from a right side and the alternating transmit electrodes and interpolated transmit electrodes below the substantially central transmit electrode are fed by routing lines from a left side.

15. The device as recited in claim 11, wherein the device is a portable computing device.

16. The device as recited in claim 11, further comprising drive lines routed on each side of the sensor.

* * * * *